COINCIDENT CURRENT MEMORY APPARATUS AND METHOD

Filed Dec. 2, 1965 5 Sheets-Sheet 1

INVENTOR
RAYMOND H. MOBERG
BY Thomas J. Nikolai
ATTORNEY

United States Patent Office
3,479,656
Patented Nov. 18, 1969

3,479,656
COINCIDENT CURRENT MEMORY APPARATUS AND METHOD

Raymond H. Moberg, St. Paul, Minn., assignor to Sperry Rand Corporation, New York, N.Y., a corporation of Delaware Filed Dec. 2, 1965, Ser. No. 511,172
Int. Cl. G11b 5/00
U.S. Cl. 340—174 17 Claims

ABSTRACT OF THE DISCLOSURE

A two-wire memory system comprising a matrix array of memory elements including a plurality of intersecting drive lines, selected intersections of which define unique memory element addresses. Sequentially timed selection drive current signals concurrently coupled to intersecting drive lines select the memory element thereat causing an output signal to be induced in the first driven intersecting drive line.

Figure 1:
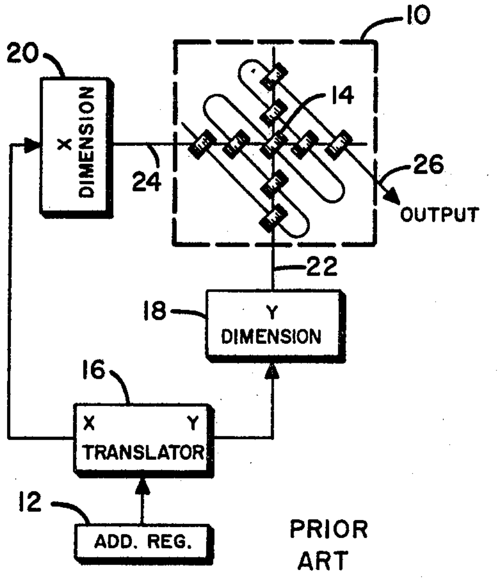

Random-access electrically-alterable memory systems as utilized in the electronic data processing field are well known and have undergone many improvements since their inception in the early 1940's. By the late 1950's such systems had been thoroughly analyzed with rather comprehensive surveys of their state-of-the-art being published—see the article "Computer Memories, a Survey of the State-of-the-Art," Proceedings of the IRE, January 1961, pages 104–127, Jan Rjachman. Such systems are generally categorized in accordance with their selection system; bit-organized (coincident-current); or, word-organized.

A word-organized memory may be defined as a memory system in which all the bits making up a multibit word are associated with a single drive line identified as the "word line." Separate lines, generally described as the "bit line" are associated with each separate bit of the multibit word. Readout is accomplished by the coupling of a full select signal to the word line which induces signals in the separate bit lines representative of the informational state of the memory element at the word line—bit line intersection. The writing operation is generally accomplished by the coupling of a full select signal to the word line. The coincident coupling of an exhibit pulse, of an opposite polarization with respect to the coincident word line pulse, inhibits the writing of a "1" in the associated inhibited memory element.

Bit-organized memories, in contrast, are generally composed of groups of parallel X and parallel Y drive lines, the groups orthogonal to each other and running through a matrix array of memory elements. Partial select signals of a predetermined polarity, generally of opposite polarity to the reading operation as compared to the writing operation, are coupled to a selected one of each of the X and Y drive lines whereby that memory element only at the intersection of the energized X and Y selected lines receives sufficient drive field to accomplish the read or write operation. As the read operation in a word-organized memory is accomplished by a full select pulse coupled to the word line, the output signal generated by each associated memory element may be carried off by the respectively associated bit line, thus performing the function of a common bit-sense line arrangement. This common bit-sense line arrangement is well known in the art; see U.S. Patents 3,054,989, 3,015,808, and 3,144,641 for various arrangements therefore. As in a bit-organized memory one each of the X and Y drive lines are utilized for the read and write operation, a separate sense line is associated with each matrix array of X and Y select lines. Thus, two-wire word-organized and three-wire bit-organized memories are well known.

The present invention is directed toward a two-wire bit-organized memory system whereby either the X or Y drive line may be used as a common bit-sense line. In the preferred embodiment of the present invention the writing operation is accomplished by always coupling an X write current to the selected X selection line during the write operation, but only coupling a Y write current to the Y selected line when a "1" is to be stored. Thus, only an X write current is coupled to the selected X drive line for the writing of a "0" but both an X write current and a Y write current are coupled to the selected X drive line and Y drive line for the writing of a "1." The read operation is, as in the prior art systems, accomplished by the coincident coupling of half-select drive signals to the selected X and Y drive lines. However, in contrast to prior art systems, as readout of the stored information is to be accomplished in one dimension, in the preferred embodiment the Y dimension, the Y read current is applied earlier than the X read current. As the selected core will not switch for a half-select current (the Y current only), all noise pulses generated by the turning on of the Y current subside before the X current is turned on. When the X drive signal is coupled to the selected X drive line the fully selected memory element changes state, inducing a corresponding signal on the Y line which corresponding signal is representative of the information state of the fully selected memory element. By properly timing the coupling of the Y and X drive signals to the selected Y and X drive lines there are induced in the selected Y drive line signals whose amplitudes are representative of a stored "1" or a stored "0"; these signals provide a detectable difference signal between such two informational states. The output signal that is induced in the selected Y drive line is reflected back into the selected Y drive line current transformer on which is provided an additional winding to which is coupled electronic circuitry capable of distinguishing between the readout of a stored "1" and a stored "0." The associated sense amplifier is then strobed at a predetermined time after initiation of the X drive signal to provide an optimum difference signal.

Accordingly, it is a primary object of the present invention to provide a novel memory selection system.

It is a further object of the present invention to provide a two-wire bit-organized memory selection system using one of the transformer-coupled selection lines as a sense line.

These and other more detailed specific objectives will be disclosed in the following specification, reference being had to the accompanying drawings.

With particular reference to FIGURE 1 there is presented a diagrammatic illustration of a prior art bit-organized memory selection system for the full selection of one memory element out of a 64 by 64 array 10 of 4,096 memory elements. In this illustration, address register 12 holds the multibit binary word that defines the address of the fully selected memory element 14. Signal representations of the contents of register 12 are coupled to translater 16 which in turn provides translated output signals to selection matrices 18 and 20. Each of matrices 18 and 20 couple a half-select drive field to one out of 64 associated drive lines, Y drive line 22 and X drive line 24, respectively, whereby only the memory element 14 at the intersection of the two affected drive lines 22 and 24 is affected by a full select drive field causing it to be readout or written-in as the case may be. Upon readout the fully selected memory element 14 induces a signal in sense line 26 which signal is representative of the informational state of memory element 14.

Figure 2:
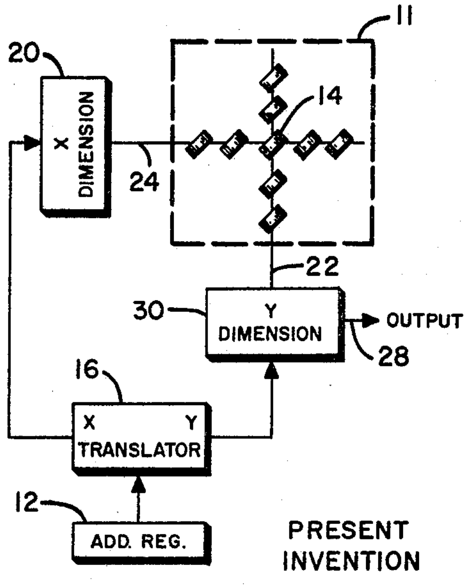

With particular reference to FIGURE 2 there is presented a diagrammatic illustration of a bit-organized memory selection system including array 11 that incorporates the present invention whereby like components have the same reference numbers as utilized in FIG. 1. In this embodiment sense line 26 is eliminated with the output signal being coupled back through Y drive line 22 and out output line 28 of matrix 30. Matrix 30 is similar to matrices 20 and 22 except that it incorporates an additional winding on a current driver transformer whereby the readout signal induced in Y drive line 22 is coupled out to a sense amplifier—discriminator circuit that discriminates between the signals coupled thereto by the readout of a stored "1" or "0." A representative signal is then, in turn, emitted therefrom on output line 28.

Figure 3:
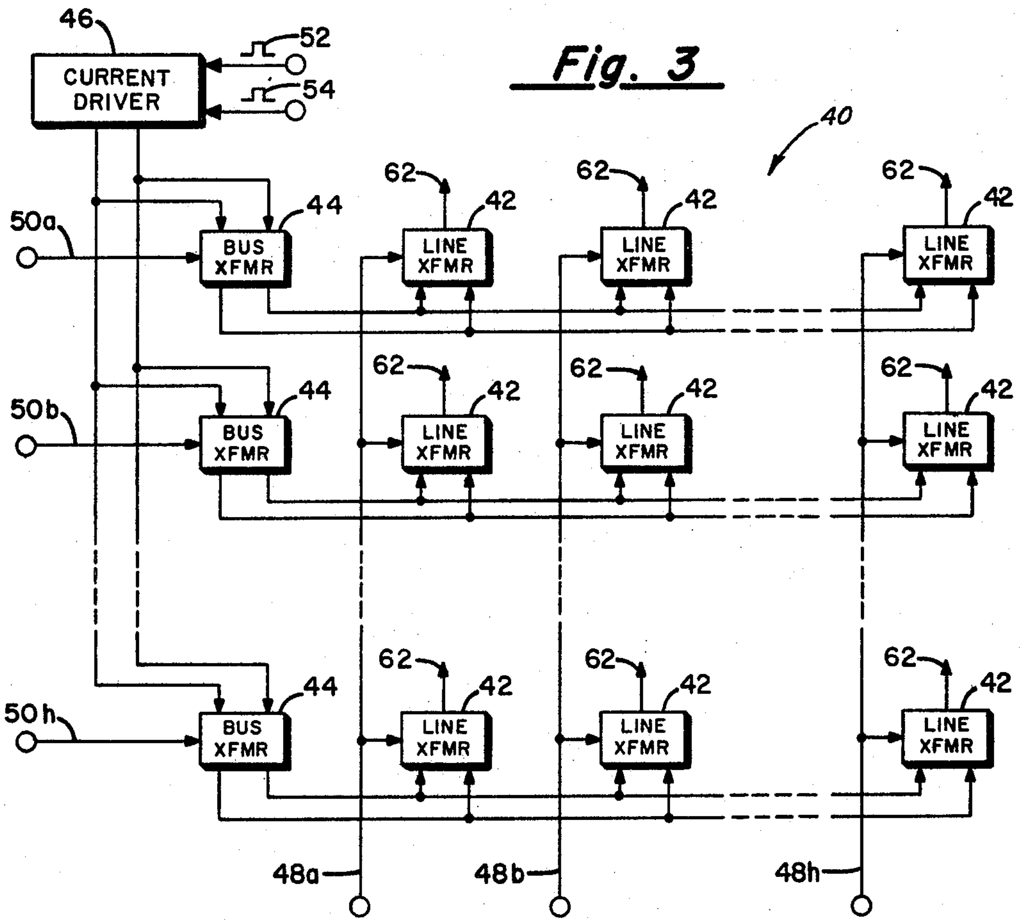

To better understand the nature of the present invention there is presented in FIGURE 3 a block diagram of a prior art bus- and line-transformer matrix 40 as utilized in the Univac 1107 Computer for the selection of one out of 64 drive lines in a 64 by 64, or a 4,096, planar array of toroidal ferrite cores serving as the memory elements. Matrix 40 is comprised of 64 line transformers 42 arranged in an 8 by 8 array whereby all line transformers 42 along a common vertical line are coupled to a line transformer bus 48 and whereby all line transformers 42 along a common horizontal line are coupled to a bus transformer 44, each one of which is driven in turn by a bus transformer bus 50. All bus transformers 44 are in turn coupled to a current driver 46 which upon application of a read pulse 52 or a write pulse 54 couples the corresponding drive current to all bus transformers 44 in parallel. A selection of one drive line, i.e., one line transformer 42, is accomplished by the coincident selection of one line transformer bus 48 and one bus transformer bus 50 whereby the line transformer 42 at the intersection of the selected line transformer bus 48 and selected bus transformer bus 50 couples a read or write drive current signal to the associated drive line and related memory elements as determined by current driver 46.

Figure 4:
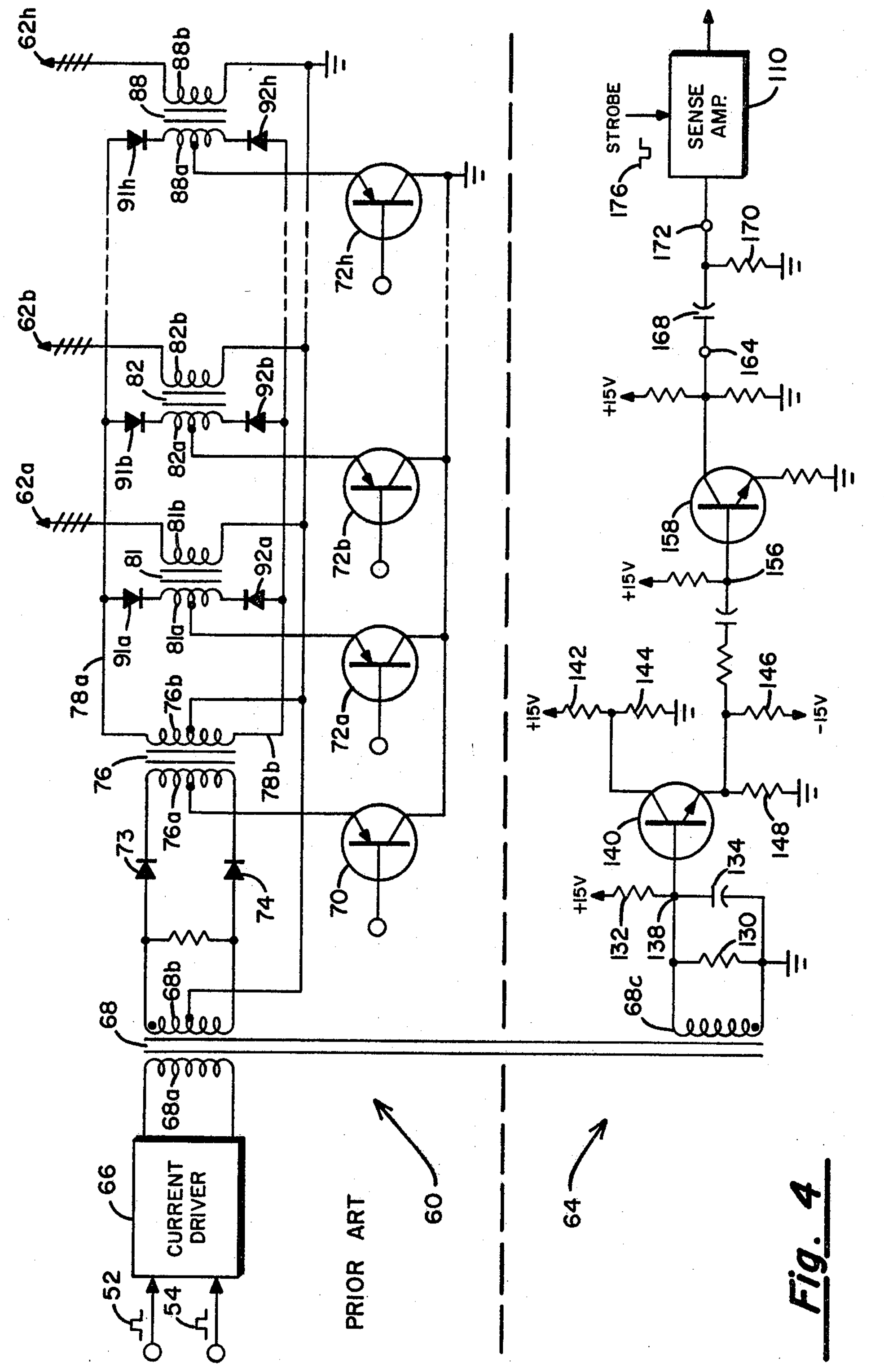

With particular reference to FIGURE 4 there is illustrated a prior art selection bus 60 providing a selection of one of a plurality of memory drive lines 62 and the sense amplifier-discriminator circuit 64 of the present invention. With current driver 66 coupling a first polarity read signal or a second and opposite polarity write signal to current drive transformer 68, any drive line 62 may be affected by the appropriate polarity current drive signal by the coincident selection of bus transformer selection transistor 70 and the associated line transformer selection transistor 72. With the first or second polarity read or write current signal being coupled to winding **68*a* of transformer 68 by current driver 66 there is induced in winding 68*b* a first or second and opposite polarity signal, which with bus transistor 70 selected by an appropriate (negative) signal coupled to its base electrode, that flows through the properly polarized diode 73 or 74, through the assocaited portion of winding 76*a* of bus transformer 76 to ground through the conducting transistor 70. This flow of current through winding 76*a* induces a corresponding signal in winding 76*b* and out across the associated line transformer busses 78*a* and 78*b*, across which are coupled a plurality of line transformers 81–88. With the first or second and opposite polarity read or write current flowing through winding 76*b* and along the associated line busses 78*a* or 78*b* there is produced across the primary windings 81*a* through 88*a* of line transformers 81 through 88, respectively, voltage which if the associated line transformer selection transistor 72 is selected, i.e., coupled by an appropriate selection pulse so as to cause the selected transistor 72 to conduct, the associated diode 91 or 92 is forward biased permitting the voltage induced in winding 76*b* to provide a current flow through the forward biased diode, the associated portion of the selected line transformer primary winding 81*a*–88*a* to ground through the selected transistor 72. This flow of a first or a second and opposite polarity current through the primary winding 81*a*–88*a* of the selected line transformer 81–88 induces the flow of a corresponding first or second and opposite polarity current signal in the associated line transformer secondary winding 81*b*–88*b*, the output of which is coupled to the selected drive line 62. Thus, when current driver 66 couples an appropriate current drive signal to current drive transformer 68, and appropriate selection signals are coupled to bus transformer selection transformer 70 and one of the plurality of line transformer selection transistors 72 there is induced an appropriate polarity current drive signal in a drive line 62 associated with the selected line transformer selection transistor 72**.

The present invention involves the addition of the sense amplifier-discriminator circuit 64 to the prior art selection bus 60 whereby upon readout of the informational state of a fully selected core along the selected drive line 62 there is induced an output signal therein which is reflected back through the selected line transformer 81–88, bus transformer 76 and into the current drive transformer 68. This output signal, which is reflected back into the current drive transformer 68, is then coupled to an additional winding **68*c* to which is coupled the sense amplifier-discriminator circuit 64** of the present invention.

Figure 5:
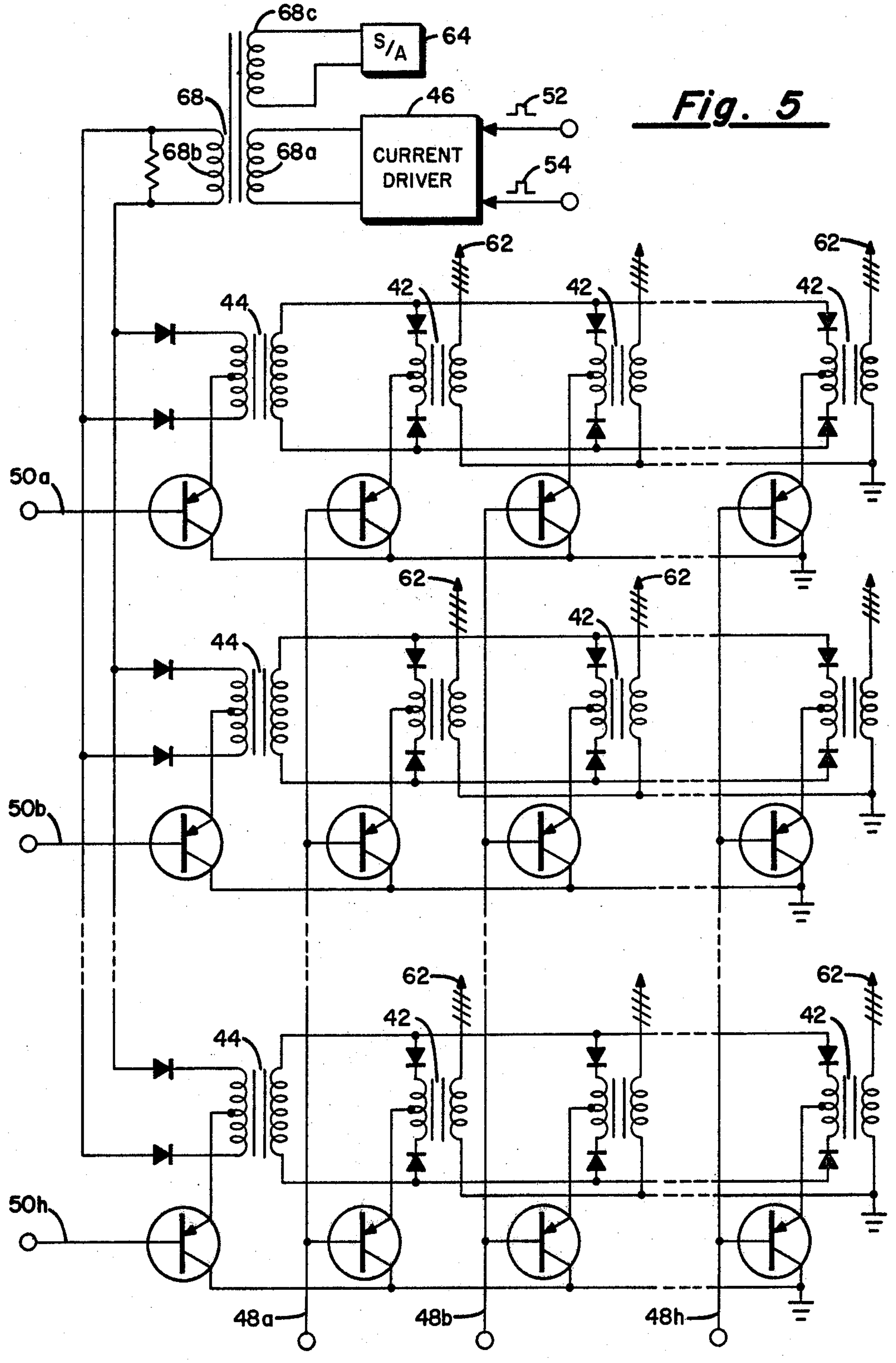

With particular reference to FIGURE 5 there is illustrated the circuit schematic of that which was depicted by the block diagram of matrix 40 of FIGURE 3. This selection matrix is the 8 by 8 selection matrix of matrices 18 and 20 of FIGURE 1 and matrix 20 of FIGURE 2. This arrangement then is the prior art arrangement whereby one out of 64 drive lines may be selected, two matrices of which would consequently select one out of 4,096 memory elements as illustrated in FIGURE 1. As stated with particular reference to FIGURE 3 the selection of one bus transformer bus 50 and one line transformer bus 48 selects the line transformer 42 at the intersection of the bus transformer bus 50 and line transformer bus 48 wherein the associated drive line receives a current drive signal as determined by current driver 46. As stated with reference to the embodiment of FIGURE 2 the present invention involves the elimination of the sense line 26 of FIGURE 1 wherein the Y dimension selection matrix 30 further includes a sense amplifier-discriminator circuit 64 as in FIGURE 4 whose output signal is indicative of the informational content of the selected memory element coincidentally energized by the single selected drive line of Y dimensional matrix 30 and X dimension selection matrix 20. Consequently, for purposes of an analogy to the embodiment of FIGURE 2 the selection matrix of FIGURE 5 is that of the Y dimension selection matrix 30 of FIGURE 2 while the X dimension selection matrix 20 thereof is that of the matrix of FIGURE 5 less the sense amplifier-discriminator circuit 64.

The basic theory of operation of the two-wire memory selection system is as follows. Addressing or selection of drive lines is the same as in all bit-organized memories, i.e., one X drive line and one Y drive line are selected for each address. Half-currents are caused to flow in each drive line that is addressed for both the read and write operation. However, since readout of the stored information is accomplished in the Y dimension (along the Y drive line) the Y read drive current is initiated earlier than the X read drive current. Since the to-be fully selected core will not switch for a half-current (the Y drive current only), all noise pulses generated by the turn-on of the Y drive current subside before the X drive current is turned on. When the X drive current is turned on, the fully addressed core switches states inducing a corresponding readout signal on the Y drive line. Proper timing between the Y and X drive currents provides a detectable "1" output signal on the Y line, as distinguished from a "0" output signal.

The write operation is accomplished by always coupling X drive current to the selected X drive line during the write time, but coupling Y write drive current to the selected Y drive line only when a "1" is to be stored. Thus, only X write drive current is caused to flow for the writing of a "0" and both X and Y write drive currents are caused to flow for the writing of a "1."

The read operation is one of the most critical problem areas of the two-wire memory selection system. The elimination of the sense winding means that retrieval of information from the fully selected core must be accomplished on the drive line of one dimension; which in the preferred embodiment of the present invention is along the Y dimension. Therefore, some method must be utilized to buffer the output signals together from the Y drive line to one sense amplifier and yet retain discrete lines for addressing, or driving, currents. The method proposed here utilizes the already-existing transformer selection system as depicted with respect to FIGURES 3, 4 and 5, Since any signal induced in a drive line will be reflected back into the selection system transformers (shorted transmission line reflection) it becomes feasible and economical to perform the readout operation directly from the existing selection transformers, which transformers normally buffer all the drive lines to one current drive source. When an additional winding at the current drive source transformer is added, all signals impressed on any or all associated drive lines can be monitored at one point (see FIGURE 5). This arrangement eliminates the need for additional output buffer circuits or transformers and does not introduce conditions that would not exist in other methods of buffering.

Figure 6:
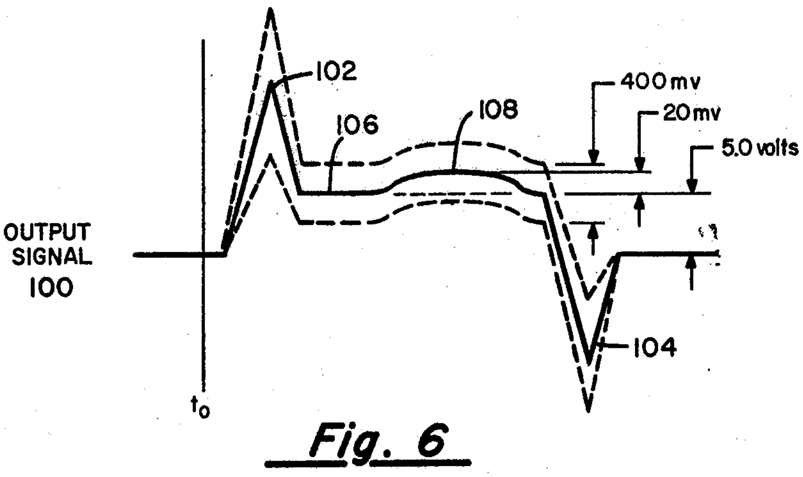

With particular reference to FIGURE 6 there is illustrated the output signal 100 associated with the embodiment of FIGURE 2. The problem area in all buffering schemes with the two-wire memory selection system is that the "1" output signal 108 is impressed upon the normally existing differential voltage signal 100 developed by the driving source (see FIGURE 6). This differential signal 100 exists in all memories but minor attention has been directed toward it in the past because of negligible coupling between the drive lines and the separate sense line. This differential signal 100 contains two basic components: inductive voltage spikes, 102 at the leading edge and 104 at the trailing edge of the applied pulse; and the DC level or "0" signal 106 between such spikes. The "1" signal 108, ideally, is impressed upon a relatively constant or flat DC level 106 of the pulse 100. Considering only one Y drive line 62 (see FIGURE 5), it would be a relatively simple matter to provide an amplifier to reject the differential portion of signal 100 and to amplify only the "1" signal 108. However, the DC portion of the differential signal 100 is composed of the Y drive line IR drops; diodes 73, 74 and 91, 92 forward voltage drops and the selection transistors 70, 72 collector-emitter voltage drops. Any or all of these components will vary within the component's specified tolerances. Since buffering of several Y drive lines (64 in the illustrated embodiment) must be done for reasons of economy, the amplitude of the DC portion 106 of the signals monitored at winding 68c will vary from address to address. Thus, sense amplifier—discriminator circuit 65 must be able to detect a 20 millivolt (mv.) "1" signal 108 from the top of a DC level 106 that has a measured variation of ±200 mv. The circuit 64 that performs this function is presented in FIGURE 4. Circuit 64 is not the complete memory sense amplifier but may be considered only a preamplifier, the output of which has successfully operated into a standard memory differential sense amplifier 110.

Figure 7:
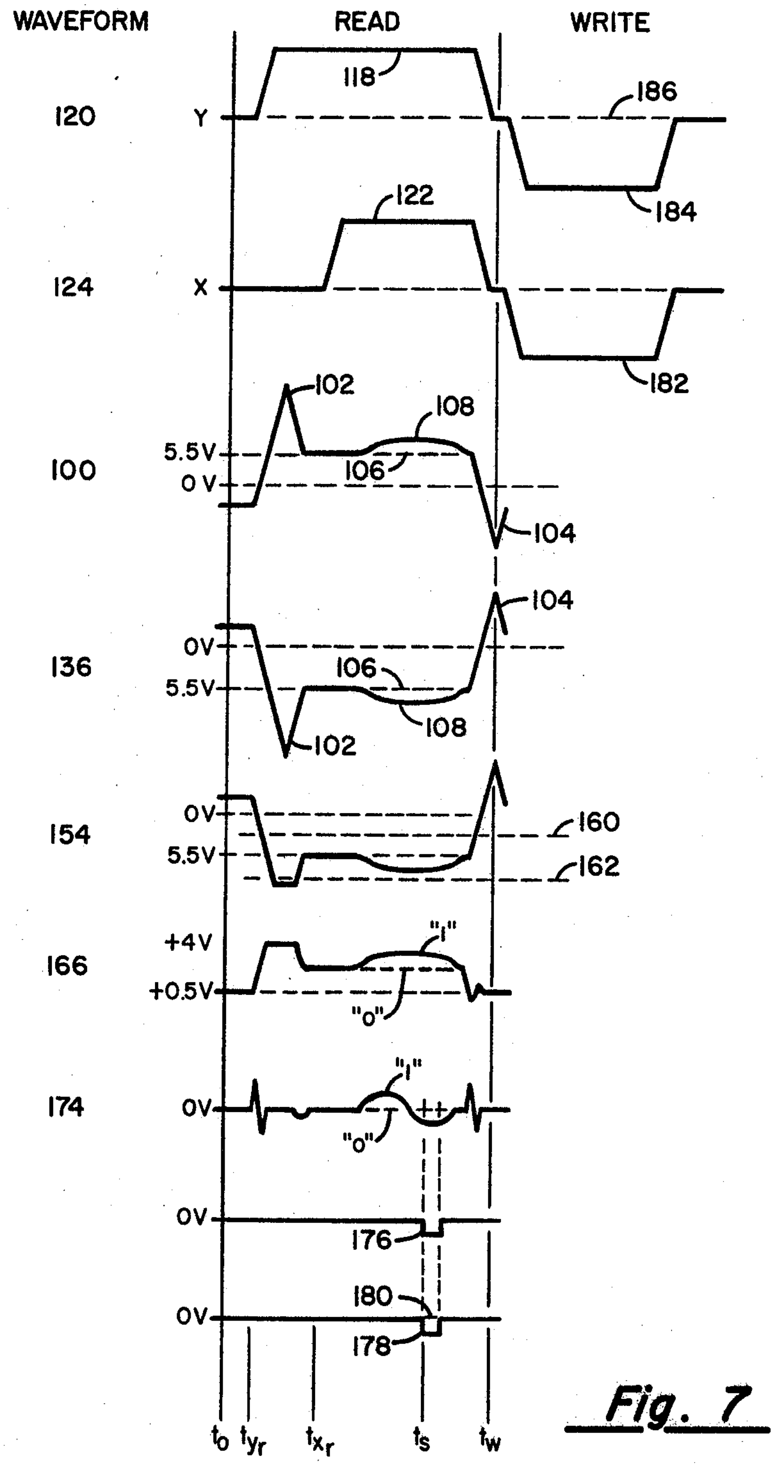

With particular reference to FIGURE 7 there is presented an illustration of the signal waveforms associated with the present invention. For the read operation, and with particular reference to the embodiment of FIGURE 2, at time $T_{yr}$ pulse 118 of waveform 120, which pulse is a half-select drive current signal, is coupled to selected Y dimension drive line 22 by matrix 30. At a subsequent time $T_{wr}$ of a sufficient time duration after $T_{yr}$ to allow the attenuation of any self-induced signals in selected Y dimension drive line 22, half-select pulse 122 of waveform 124 is coupled to selected X dimension drive line 24 by X dimension matrix 20. The concurrent effect of half-select pulses 118 and 122 causes fully selected core 14 to switch, or not switch, its magnetic state as the function of the prior stored informational state being a "1" or a "0." The effect of half-select pulses 118 and 122 on core 14 is to cause a signal of waveform 100 to be induced in selected Y dimension drive line 22 of FIGURE 2 (or drive line 62 of FIGURE 5). Waveform 100 is reflected back through the selected line transformer 42, the selected bus transformer 44 and the current drive transformer 68 (see FIGURE 5) and is then coupled to circuit 64 by means means of winding 68c.

Circuit 64 (see FIGURE 4) functions in the following manner. Waveform 100 is coupled by means of winding 68c to the inverting circuit formed by resistors 130 and 132 and capacitor 134 which components are coupled between the +15 volt reference voltage and ground potential providing waveform 136 (which is essentially an inverted waveform 100) at node 138 which node is also the base electrode of transistor 140. Transistor 140 is coupled in an emitter-follower configuration by resistors 142 and 144 between the +15 volt reference potential and ground potential at its collector electrode and resistors 146 and 148 between the −15 volt reference potential and ground potential at its emitter electrode and "clips" the peaks of signal 136 producing signal 154 at node 156. The input signal 154 to transistor 158 passes from positive to negative through ground potential with the "1" signal 108 appearing only on that portion of signal 154 at node 156 that goes below ground potential. Thus, transistor 158 is biased into the conducting mode and remains in the conducting mode until the signal 154 passes through ground potential into the negative voltage level. At this point transistor 158 begins to amplify the information carrying portion of signal 154. With transistor 158 biased such that the input signal 154 will not reverse bias transistor 158 into the nonconducting mode, only that portion of signal 154 that lies between the operating limits of transistor 158 defined by lines 160 and 162 is amplified and is made available at node 164 as waveform 166.

Signal 166 at node 164 is coupled into the differentiating circuit formed by capacitor 168 and resistor 170 providing at node 172 the differentiated output signal 174. Signal 174 is, at node 172, coupled to a standard differential sense amplifier 110 which amplifier is strobed by strobe pulse 176 at time $t_s$ to provide an output signal 178 representative of a stored "1" or an output signal 180 representative of a stored "0" being read out of a fully selected core 14—see FIGURE 2.

The writing operation of the embodiment of FIGURE 2, as described above, is similar to prior art bit-organized writing techniques. X dimension matrix 20 and Y dimension matrix 30 are caused to concurrently couple pulse 182 and pulse 184 for the writing of a "1" or pulse 186 for the writing of a "0," respectively, to their associated selected X dimension drive line 24 and Y dimension drive line 22.

Figure 8:
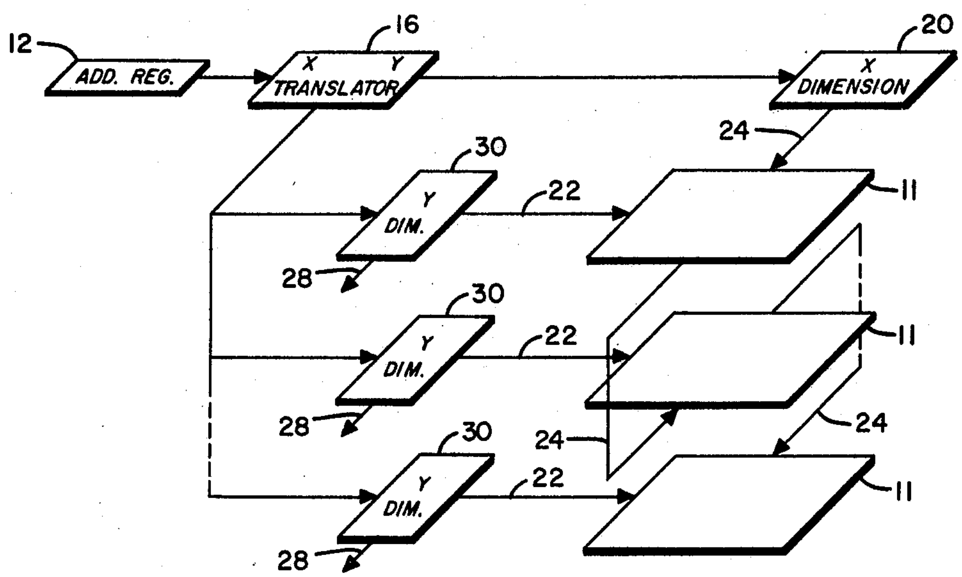

The present invention has been described in detail with particular reference to the two-dimensional memory selection system depicted in FIGURE 2. However, it is to be appreciated that the inventive concept of the present invention is not to be construed as to be limited to a two-dimensional memory selection system. As in example of a three-dimensional memory selection system incorporating the inventive concept of the present invention reference may be had to the embodiment of FIGURE 8 in which like components are assigned the same reference number as in FIGURE 2. In this embodiment the selected lines emanating from X dimension matrix 20 thread each plane 11 in a serial manner while each plane 11 has a separately associated Y dimension matrix 30 with its separately associated drive lines 22. Thus, it is apparent that by the use of the reading operation as previously described herein the fully selected memory element 14 of each plane 11 provides its corresponding output signal on its associated ouptut line 28. As previously described herein the effecting of a read or write operation is accomplished by the proper initiation of the current driver associated with each X and Y dimension matrix. Additionally, it is apparent that a plurality of planes 11 could be arranged in a two-dimensional package wherein the plurality of planes 11 may be aligned in one or a plurality of lines in the X dimension wherein the like ordered X drive lines are serially intercoupled to an X dimension matrix and a separate Y dimension matrix is coupled to each plane 11.

Having, now, fully illustrated and described my invention, what I claim to be new and desire to protect by Letters Patent is set forth in the appended claims.

What is claimed is:

1. A two-wire bit-organized memory system, comprising:

a plurality of memory elements;

a two-dimensional matrix array including a plurality of X drive lines and of Y drive lines selected intersections of which lines define unique memory addresses for memory elements thereat;

an X dimension matrix for selecting one out of said X drive lines;

a Y dimension matrix for selecting one out of said Y drive lines;

each of said X and Y dimension matrices driven by a current driver coupled thereto by a current drive transformer for coupling coincident, partial-select current-signals to a fully-selected memory element; and a sense amplifier coupled to said Y dimension matrix current drive transformer for reading out the current signal in the Y drive line that is coupled to said fully-selected memory element.

2. The memory system of claim 1 wherein said X drive lines and said Y drive lines are each arranged in sets of parallel lines which sets are orthogonal to each other.

3. The memory system of claim 2 wherein each intersection of each X and Y drive line defines a unique memory address for a memory element thereat.

4. The memory system of claim 3 wherein said X and said Y dimension matrices are each driven by a separate, associated, current driver.

5. The memory system of claim 4 wherein each of said partial-select current-signals are of approximately one-half full-select intensity.

6. The memory system of claim 5 wherein the partial-select current-signal effected by said Y dimension matrix current drivers is delayed with respect to the partial-select current-signal effected by said X dimension matrix current driver.

7. A two-wire bit-organized memory system, comprising:

a plurality of two-dimensional matrix arrays, each matrix array including;

a plurality of memory elements;

a plurality of X drive lines and of Y drive lines, selected intersections of which lines define unique memory addresses for memory elements thereat;

a selected X drive line of each matrix array serially intercoupled;

an X dimension matrix for selecting one out of said intercoupled X drive lines;

a plurality of Y dimension matrices, one associated with a separate one of said matrix arrays for selecting one out of said Y lines of the associated matrix array;

each of said X and Y dimension matrices driven by a current driver coupled thereto by a current drive transformer for coupling coincident, partial-select current-signals to a fully-selected memory element;

a sense amplifier coupled to each of said Y dimension matrix current drive transformers for reading out the current signal in the Y drive line that is coupled to the fully-selected memory element of the associated matrix array.

8. The memory system of claim 7 wherein said plurality of matrix arrays are arranged in a two-dimensional package.

9. The memory element of claim 8 wherein selected ones of said plurality of matrix arrays are aligned along the X dimension.

10. The memory element of claim 8 wherein correspondingly ordered X drive lines of each matrix array are serially interconnected.

11. The memory element of claim 7 wherein each of said partial-select current-signals are of approximately one-half full-select intensity.

12. The memory system of claim 7 wherein said plurality of two-dimensional matrix arrays are arranged in a stacked, superposed three-dimensional package.

13. The memory system of claim 12 wherein correspondingly ordered X drive lines of each matrix array are serially interconnected.

14. The memory system of claim 13 wherein each of said partial-select current-signals are of approximately one-half full-select intensity.

15. A method of operating a two-wire bit-organized memory system, said memory system comprising a two-dimensional matrix array having a plurality of X drive lines and a plurality of Y drive lines, selected intersections of which lines define unique memory addresses for memory elements thereat, the method comprising the steps of:

coupling a first partial-select current-signal to a first end of only one of said Y drive lines;

coupling a second partial-select current-signal to a first end of only one of said X drive lines at a time subsequent to the coupling of the partial-select current-signal to said one Y drive line but at least partially coincident in time therewith;

detecting the informational state of the fully-selected memory element that is coincidentally affected by said first and second partial-select current-signals by reading-out at said first end the curernt signal in the one Y drive line that is coupled to said fully-selected memory element.

16. The method of claim 15 wherein said first and second partial-select current-signals are of approximately one-half full-select intensity.

17. The method of claim 15 wherein said time subsequent is sufficient to permit the attenuation of noise signals induced in said one Y drive line due to the coupling of the first partial-select current-signal thereto.

References Cited

UNITED STATES PATENTS

| | | | |
|---|---|---|---|
| 3,296,600 | 1/1967 | Einsele | 340—174 |
| 3,200,381 | 8/1965 | Kuttner | 340—174 |
| 3,181,131 | 4/1965 | Pryor et al. | 340—174 |

STANLEY M. URYNOWICZ, Jr., Primary Examiner

K. E. KROSIN, Assistant Examiner

U.S. Cl. X.R.

340—173